US012090496B2

(12) United States Patent
Ni et al.

(10) Patent No.: US 12,090,496 B2
(45) Date of Patent: Sep. 17, 2024

(54) WATERWAY SWITCHING STRUCTURE FOR MULTIFUNCTIONAL SHOWER HEAD AND MULTIFUNCTIONAL SHOWER HEAD INCLUDING SAME

(71) Applicant: XIAMEN DELMEI SANITARY WARE CO., LTD., Xiamen (CN)

(72) Inventors: Changzheng Ni, Xiamen (CN); Guiyun Zhang, Xingren (CN); Chunhua Wang, Xiamen (CN); Wenjun Li, Nanping (CN)

(73) Assignee: XIAMEN DELMEI SANITARY WARE CO., LTD., Xiamen (CN)

( * ) Notice: Subject to any disclaimer, the term of this patent is extended or adjusted under 35 U.S.C. 154(b) by 478 days.

(21) Appl. No.: 17/504,527

(22) Filed: Oct. 19, 2021

(65) Prior Publication Data

US 2023/0083299 A1 Mar. 16, 2023

(30) Foreign Application Priority Data

Sep. 13, 2021 (CN) ......................... 202111070654.8

(51) Int. Cl.
*B05B 1/18* (2006.01)
*B05B 1/16* (2006.01)

(52) U.S. Cl.
CPC ................................. *B05B 1/1636* (2013.01)

(58) Field of Classification Search
CPC .......... B05B 1/1636; B05B 1/169; B05B 1/18
See application file for complete search history.

(56) References Cited

U.S. PATENT DOCUMENTS

2016/0325291 A1* 11/2016 Zhou ......................... B05B 1/18
2020/0001314 A1* 1/2020 Yang ........................ A47K 3/28
2020/0086332 A1* 3/2020 Huang .................. B05B 1/1627
2020/0197962 A1* 6/2020 Hu ............................ B05B 1/30

* cited by examiner

*Primary Examiner* — Qingzhang Zhou

(57) ABSTRACT

A waterway switching structure for a multifunctional shower head includes a water diversion seat, a water outlet body, a switching assembly, and a driving assembly. The driving assembly includes a rotating shaft, a driving wheel, a master wheel, and a slave wheel. The driving wheel is rotatably connected to the rotating shaft, the master wheel and the slave wheel are linked to the rotating shaft. A first end of the driving wheel is movably provided with a driving detent which fits into the notch of the master wheel, the slave wheel is provided with water inlet holes. The switching assembly is rotatably connected to the driving wheel. A second end of the driving wheel is connected to a resetting member to move the driving wheel backward. The slave wheel is driven to enable the water inlet holes selectively switch on the water diversion holes communicating with the respective waterway.

10 Claims, 7 Drawing Sheets

WATERWAY SWITCHING STRUCTURE FOR MULTIFUNCTIONAL SHOWER HEAD AND MULTIFUNCTIONAL SHOWER HEAD INCLUDING SAME

CROSS-REFERENCE TO RELATED APPLICATIONS

This application is based upon and claims priority to Chinese Patent Application No. 202111070654.8, filed on Sep. 13, 2021, the entire content of which is incorporated herein by reference.

TECHNICAL FIELD

The present disclosure relates to the technical field of water outlet devices, particularly to a waterway switching structure for multifunctional shower head and multifunctional shower head including same.

BACKGROUND

Existing shower heads with a waterway switching function are usually configured with a driving mechanism to drive the water diversion plate to rotate, so as to realize waterway switching. Commonly used driving mechanisms on the market include press button switch driving, cover rotation switch driving, swing switch driving, etc. The traditional press button switch shower head is likely to have jamming, skip over, or a stuck phenomena, and has poor button pressing hand feel, while requiring high operating force. Moreover, regardless of which driving mechanism is adopted, sealing rings or welding with ABS materials are usually used in the internal components of the shower head. However, the sealing ring is easy to get displaced during the rotation of the water diversion plate, which affects sealing performance of the shower head.

SUMMARY

The present disclosure is intended to overcome the drawbacks of the prior art and provide a waterway switching structure for multifunctional shower head.

In order to achieve the above objective, the technical solution of the present disclosure is described below.

A waterway switching structure for multifunctional shower head includes a water diversion seat with a water inlet channel, a water outlet body with a plurality of waterways, a switching assembly, and a driving assembly. The water diversion seat is connected to the water outlet body and a water diversion chamber is formed between the water diversion seat and the water outlet body. The water diversion chamber communicates with the water inlet channel, and an inner bottom wall of the water diversion chamber is provided with a plurality of water diversion holes. The water diversion holes correspondingly communicate with the plurality of waterways. The driving assembly includes a rotating shaft, a driving wheel, a master wheel, and a slave wheel. The driving wheel is rotatably connected to the rotating shaft and is located on a top surface of the water diversion seat. The master wheel is connected to the rotating shaft in a transmission manner and is located between the driving wheel and the water diversion seat. The slave wheel is connected to the rotating shaft in a transmission manner and is located in the water diversion chamber. A first end of the driving wheel is movably provided with a driving detent, and an end of the driving detent fits with gear teeth of the master wheel to move the master wheel forward and prevents it from moving backward. The slave wheel is provided with a plurality of water inlet holes. The switching assembly is rotatably connected to a first end of the driving wheel to drive the driving wheel to rotate around the rotating shaft. A second end of the driving wheel is connected to a resetting member, and the resetting member drives the driving wheel to move backward to an original position when a force applied on the driving wheel through the switching assembly is retracted. The slave wheel is driven to enable the water inlet holes selectively switch on the water diversion holes communicating with the respective waterway.

Further, the switching assembly includes a button, a sliding rod, and a pull rod. The sliding rod is connected to the button in a transmission manner and is located on the top surface of the water diversion seat. A first end of the pull rod is hinged with the sliding rod, and a second end of the pull rod is rotatably connected with the first end of the driving wheel. The sliding rod linearly moves in a direction opposite to a direction of pressing the button, and the pull rod converts a linear motion of the sliding rod into a rotational motion of the driving wheel.

Further, the slave wheel cooperates with a sealing assembly to make a resistance of a relative movement between the slave wheel and the sealing assembly slightly larger than a resetting force of the resetting member.

Further, the master wheel is a ratchet wheel, and the driving detent includes a main body, a wedge block, and a fixing rod. The fixing rod is fixedly connected to a rear end surface of the main body, a rear end surface of the wedge block is fixedly connected to a front end surface of the main body, and a front end surface of the wedge block is an inclined surface that fits with an arc surface of the gear teeth of the master wheel. A right end surface of the wedge block is a stopping surface, and the stopping surface fits into a notch of the master wheel. The first end of the driving wheel is provided with a fixing groove, a rear end surface of the fixing groove is provided with a forwardly extending hollow positioning column, a first spring is provided around the hollow positioning column and the fixing rod, and two ends of the first spring respectively abut the rear end surface of the fixing groove and the rear end surface of the main body. The main body is slidably configured in the fixing groove.

Further, the main body includes an upper positioning plate, a lower positioning plate, and a positioning column. The positioning column is connected between the upper positioning plate and the lower positioning plate in a middle position and forms sliding grooves on both sides, and two side walls of the fixing groove are respectively provided with a wedge-shaped sliding rail at a position near a front end surface of the fixing groove. Two opposite side surfaces of the wedge-shaped sliding rails each have a concave arc shape, which jointly form a space for holding the first spring, and the wedge-shaped sliding rails are slidably connected with the sliding grooves.

Further, the water diversion seat includes a water inlet portion and a fixing portion. A middle part of the water inlet portion is configured with a through hole, the water inlet channel surrounds the through hole. A connection joint between the water inlet portion and the fixing portion is provided with a water inlet port. The water inlet port communicates with the water diversion chamber. A water inlet cover is configured above the water inlet portion, and the water inlet cover is provided with a through hole corresponding to the through hole of the water inlet portion. Two opposite side walls of the through hole of the water inlet cover are respectively provided with a sliding rail, the two side walls of the sliding rod are respectively provided with a sliding groove, and the sliding rail is matched with the sliding groove.

Further, the button includes a key, an engaging element, and a swing lever, the engaging element is clamped with the water inlet portion, a middle part of the swing lever is hinged with the water inlet portion by a pin. A first end of the swing lever abuts against an inner bottom wall of the key, and a second end of the swing lever extends obliquely through the through holes of the water inlet portion and the water inlet cover and props between two side walls of an opening in the middle of the sliding rod. A rear side surface of the opening is provided with a supporting rod to abut against a rear side of swing lever. The resetting member is a second spring, and the second spring is connected between the second end of the driving wheel and the water inlet cover.

Further, the water outlet body includes the water diversion plate, a water separation plate, a first outlet panel, and a second outlet panel that are sequentially connected from an inside to an outside. An inwardly concave recess is provided in a middle position of the water diversion plate, the fixing portion is engaged with the recess, a bottom wall of the recess is provided with the plurality of water division holes. The water separation plate is sequentially provided with three identical water outlet groups, and each water outlet group is sequentially provided with three different water outlet holes, and three different water outlet holes are respectively connected to the three waterways defined by the first outlet panel and the second outlet panel. The slave wheel is provided with six water inlet holes with uniform intervals, and the six water inlet holes selectively switch on one of the three waterways.

Further, the water diversion plate, the second outlet panel, and the water separation plate are made of polyformaldehyde (POM) material. An outer edge of a bottom surface of the water diversion plate and an outer edge of an upper surface of the second outlet panel are connected by hot plate welding, and an bottom outer edge of the recess is also connected to an outer edge of an upper surface of the water separation plate by hot plate welding.

According to another aspect, the present disclosure provides a multifunctional shower head, which includes a housing and the aforementioned waterway switching structure. The housing includes an upper cover and a decorative cover, and the upper cover includes a head portion and a handle portion connected to the head portion. The decorative cover is snap-fitted with the head portion to form a chamber. A main shaft is installed in the handle portion for communicating with a water inlet pipe, and the waterway switching structure is installed in the chamber, and the water inlet channel communicates with the main shaft.

The present disclosure has the following advantages.

The waterway switching structure of the present disclosure can realize three water outlet functions by pressing the button. The structure is easy to assemble, may prevent the phenomena of skipping over, jamming or getting stuck, etc., and has a suitable operating pressure for the button and better sealing performance.

BRIEF DESCRIPTION OF DRAWINGS

In order to clearly explain the embodiments of the present disclosure or the technical solution of the prior art, the drawings that would be used in describing the embodiments or the solution of the prior art will briefly introduced below. It should be understood that the drawings illustrated below merely include some of the embodiments of the present disclosure and should not be considered as limiting the scope of the present disclosure. For those of ordinary skill in the art, other drawings may be derived based on these drawings without creative effort.

Figure 1:
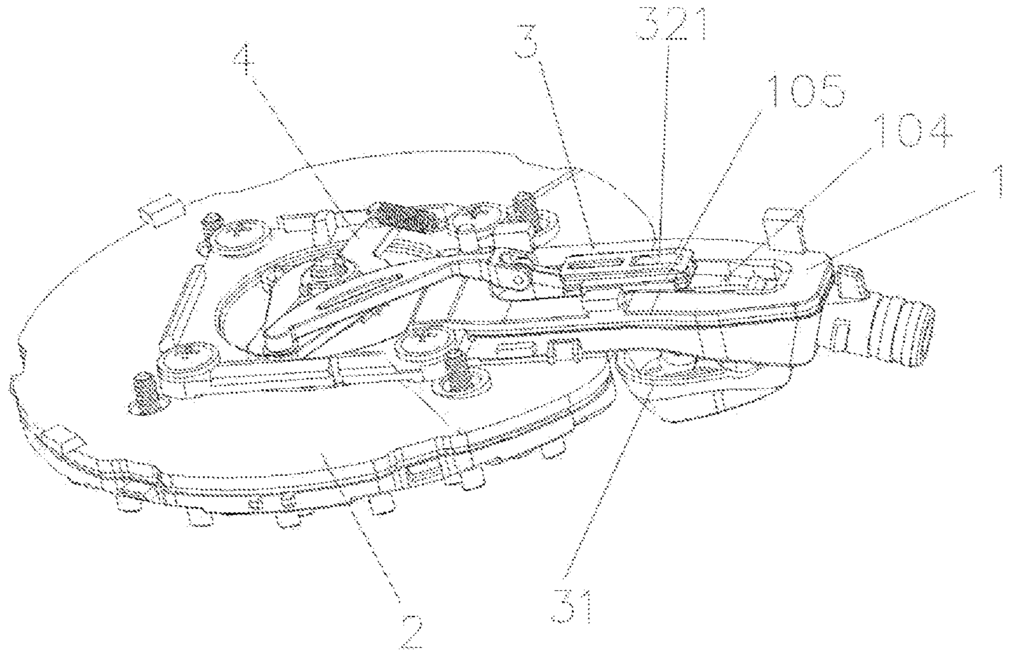
FIG. 1 is a perspective view of a waterway switching structure for a multifunctional shower head according to an embodiment of the present disclosure.

Reference numerals are listed below:

1. Water diversion seat; 11. Water inlet portion; 12. Fixing portion; 13. Water inlet cover; 101. Water inlet channel; 102. Through hole; 103. Water inlet port; 104. Through hole of water inlet cover; 105. Sliding rail;

2. Water outlet body; 21. Water division plate; 211. recess; 22. Water separation plate; 23. First outlet panel; 24. Second outlet panel; 201. Water division chamber; 202. Water division hole;

3. Switching assembly; 31. Button; 311. Key; 312. Engaging element; 313. Swing lever; 32. Sliding rod; 321. Opening; 322. Supporting rod; 33. Pull rod; 331. First connecting part; 332. Second connecting part;

4. Driving assembly; 41. Rotating shaft; 42. Driving wheel; 421. Fixing groove; 4211. Wedge-shaped sliding rail; 422. Hollow positioning column; 423. First spring; 43. Master wheel; 44. Slave wheel; 441. Water inlet hole; 45. Driving detent; 451. Main body; 4511. Upper positioning plate; 4512. Lower positioning plate; 4513. Positioning column; 452. Wedge block; 453. Fixing rod;

5. Sealing assembly; 51. Irregular sealing member; 52. First O-ring; 53. Second O-ring; 54. Third O-ring;

61. Housing; 611. Head portion; 612. Handle portion; 613. Main shaft; 62. decorative cover.

The realization of the objectives, function, characteristics, and advantages of the present disclosure will be further described in conjunction with the embodiments and with reference to the drawings.

DETAILED DESCRIPTION

In order to make the objectives, technical solutions, and advantages of the embodiments of the present disclosure clearer, the technical solutions of the embodiments of the present disclosure will be described clearly and completely below with reference to the drawings of the embodiments of the present disclosure. Obviously, the described embodiments are parts of, but not all of, the embodiments of the present disclosure. Based on the embodiments of the present disclosure, all other embodiments derived by those of ordinary skills in the art without creative effort fall within the scope of protection of the present disclosure. Accordingly, the following detailed description of the embodiments of the present disclosure shown in the drawings is not intended to limit the scope of protection of the present disclosure, but merely to represent selected embodiments of the present disclosure. Based on the embodiments of the present disclosure, all other implementations derived by those of ordinary skill in the art without creative effort fall within the scope of the present disclosure.

In the description of the present disclosure, it should be noted that the terms of "up", "down", "inside/inner", "outside/outer", "front end", "rear end", "two ends", "one end", "another end", "one side", "another side" for indicating the location or orientation are based on the location or orientation shown in the drawings for the sake of simplifying the description of the present disclosure, rather than indicate or imply that the indicated device or component must have specific location or orientation, or be constructed and operated by specific orientation. These terms should not be understood as limits to the present disclosure. Also, the terms "first", "second" are used only for descriptive purposes and cannot be understood as indicating or implying relative importance or implying the number of indicated technical features.

In the description of the disclosure, it should be noted that, unless otherwise clearly defined and limited, the terms "provide", "connect", etc. should be understood in a broad sense, for example, "connect" may be a fixed connection, a detachable connection, or an integrated connection. Or, the connection may be a mechanical connection or an electrical connection, or may be a direct connection or an indirect connection through an intermediate medium, or may be an internal communication between two components. For those of ordinary skill in the art, the specific meaning of the above-mentioned terms in the present disclosure can be specifically understood under specific circumstances.

The details of the present disclosure will be described below in conjunction with the embodiments.

Figure 2:
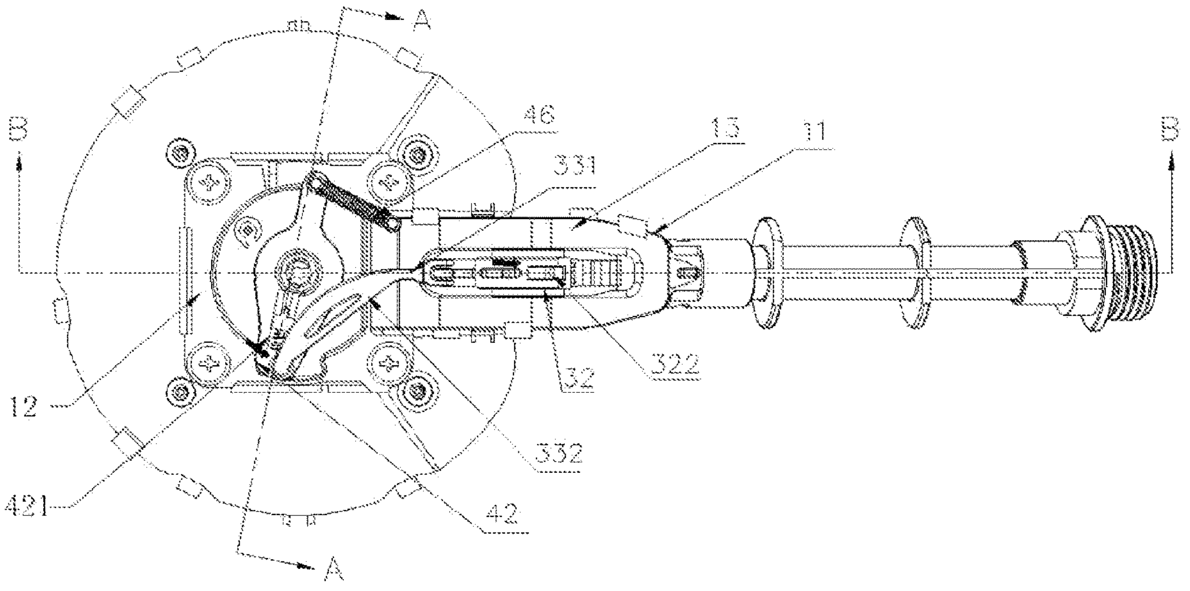
FIG. 2 is a top view of the waterway switching structure for the multifunctional shower head according to an embodiment of the present disclosure.
Figure 3:
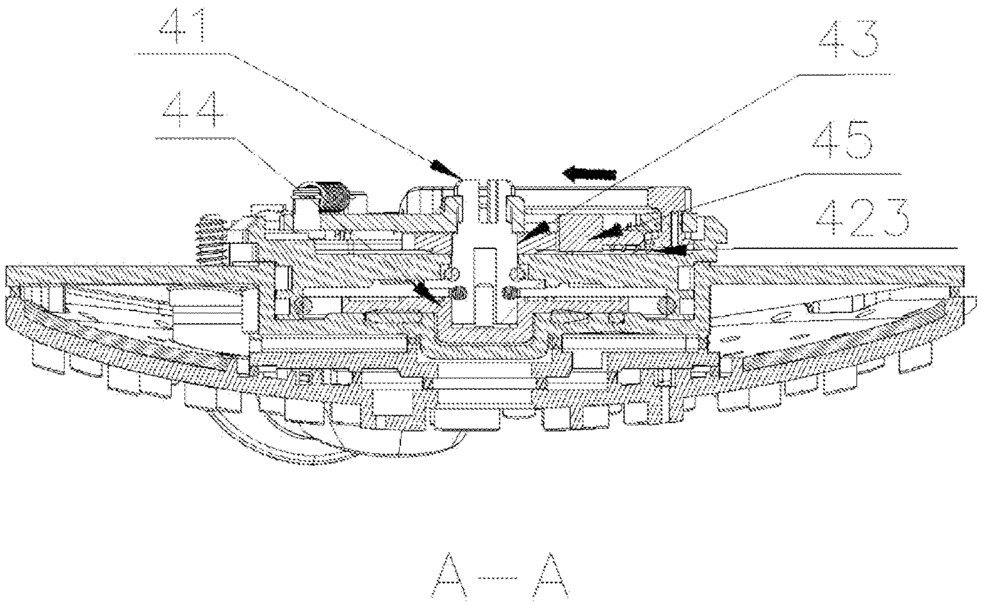
FIG. 3 is a cross-sectional view along A-A of FIG. 2.
Figure 4:
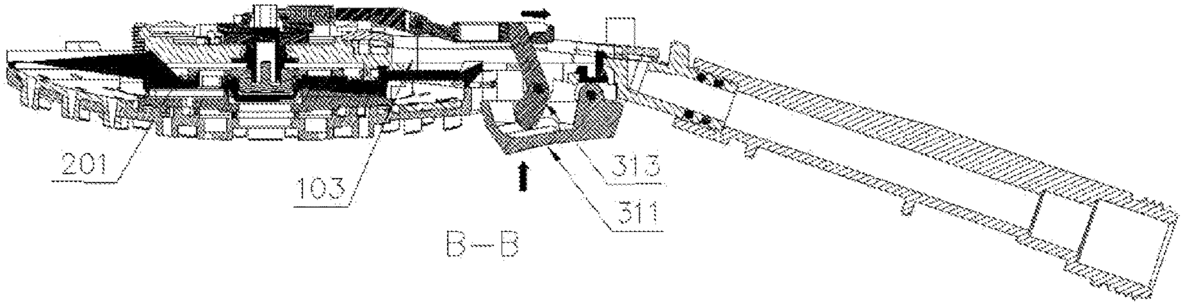
FIG. 4 is a cross-sectional view along B-B of FIG. 2.
Figure 5:
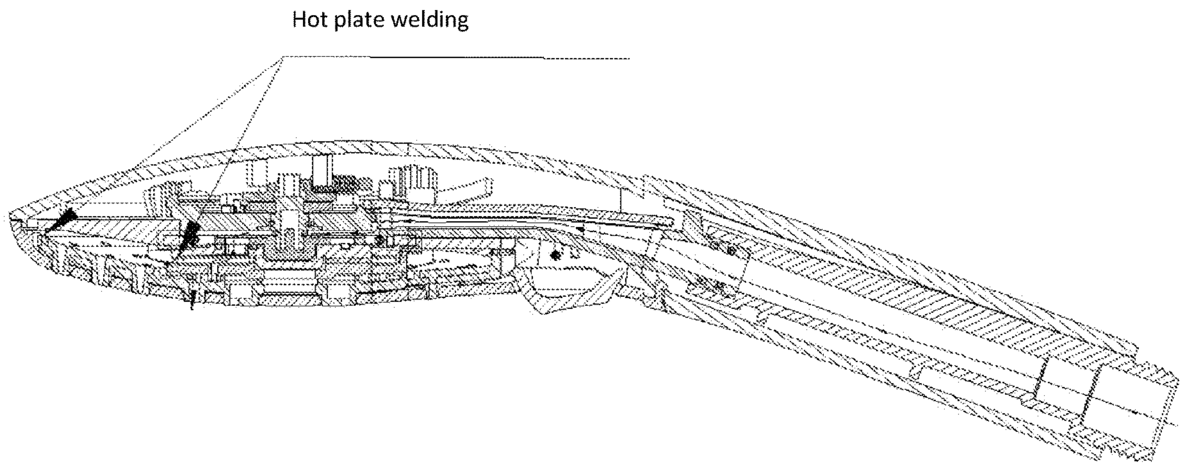
FIG. 5 is a schematic diagram showing a first water outlet function of the waterway switching structure for the multifunctional shower head according to an embodiment of the present disclosure.
Figure 6:
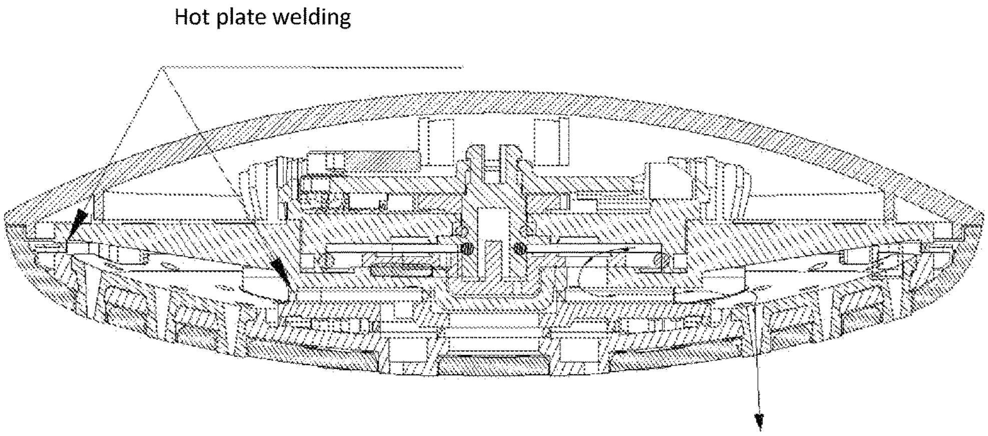
FIG. 6 is a schematic diagram showing a second water outlet function of the waterway switching structure for the multifunctional shower head according to an embodiment of the present disclosure.
Figure 7:
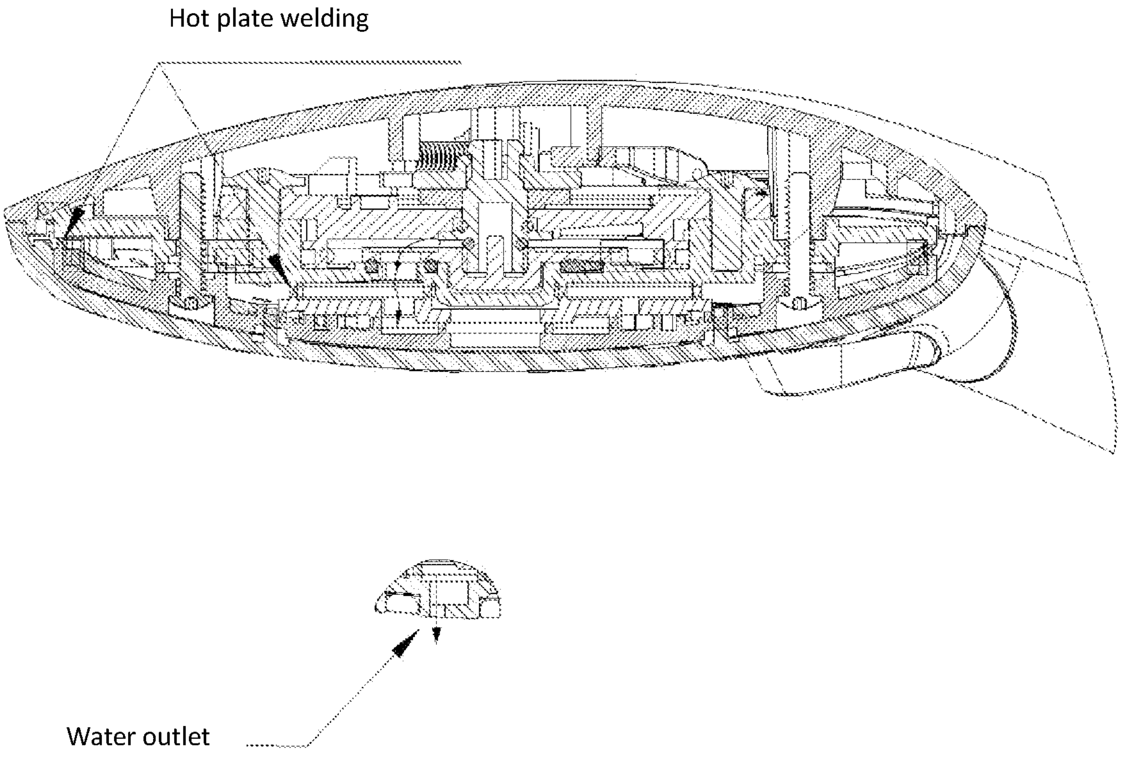
FIG. 7 is a schematic diagram showing a third water outlet function of the waterway switching structure for the multifunctional shower head according to an embodiment of the present disclosure.
Figure 8:
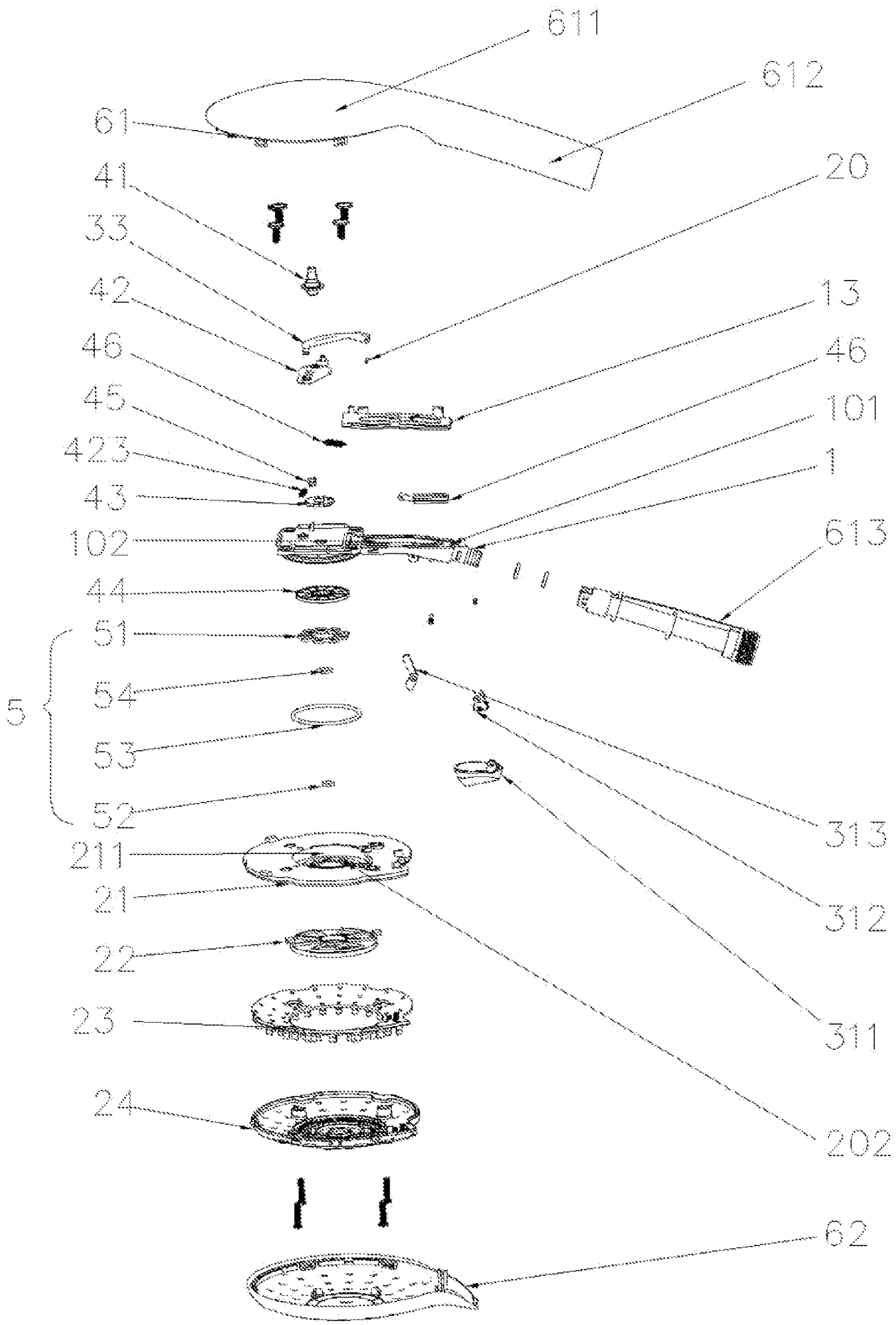
FIG. 8 is an exploded view of the multifunctional shower head according to an embodiment of the present disclosure.
Figure 9:
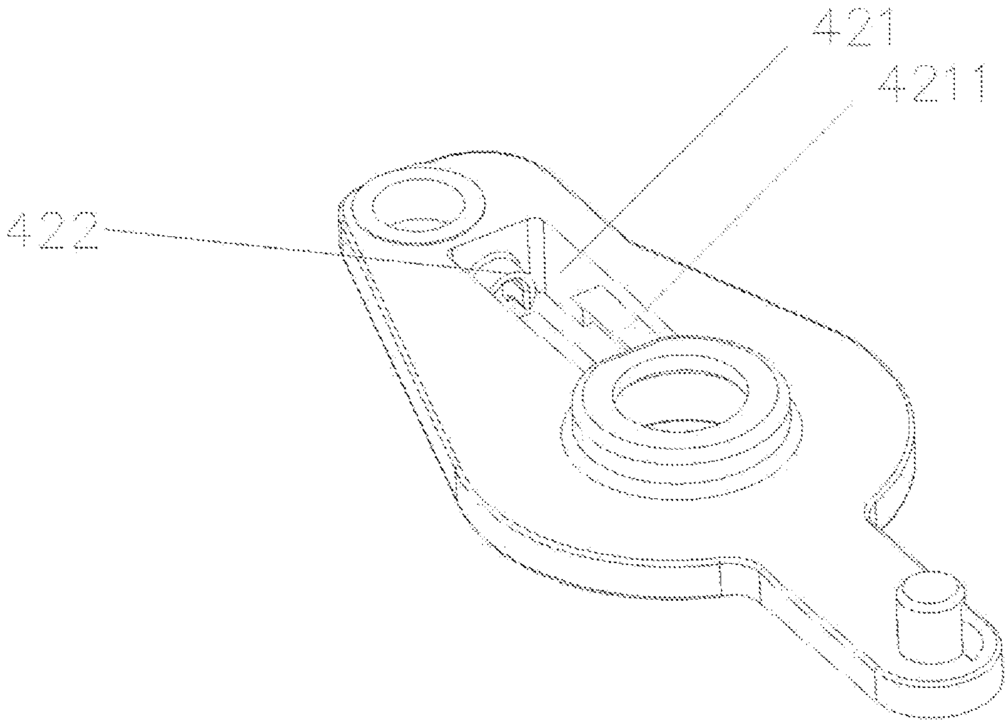
FIG. 9 is a structural schematic diagram of a driving wheel of the waterway switching structure for the multifunctional shower head according to an embodiment of the present disclosure.
Figure 10:
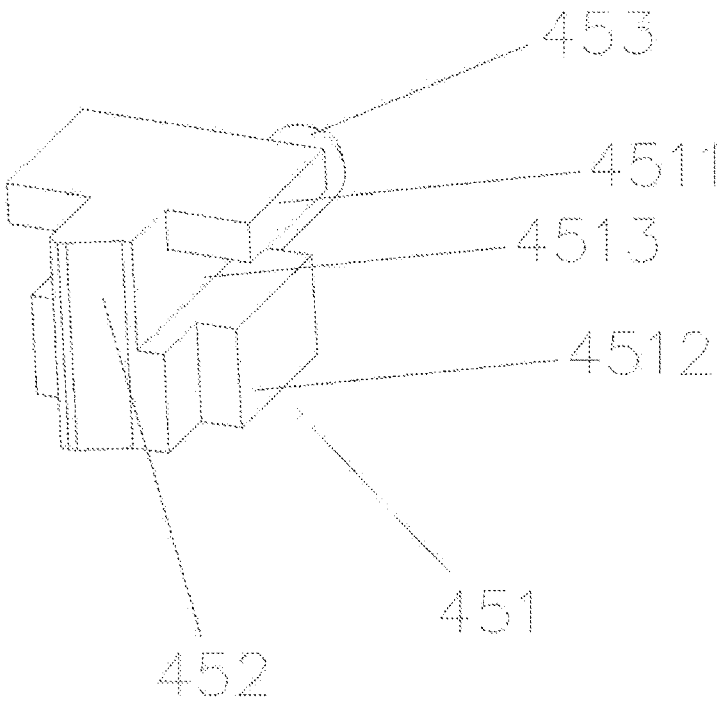
FIG. 10 is a structural schematic diagram of a driving detent of the waterway switching structure for the multifunctional shower head according to an embodiment of the present disclosure.
Figure 11:
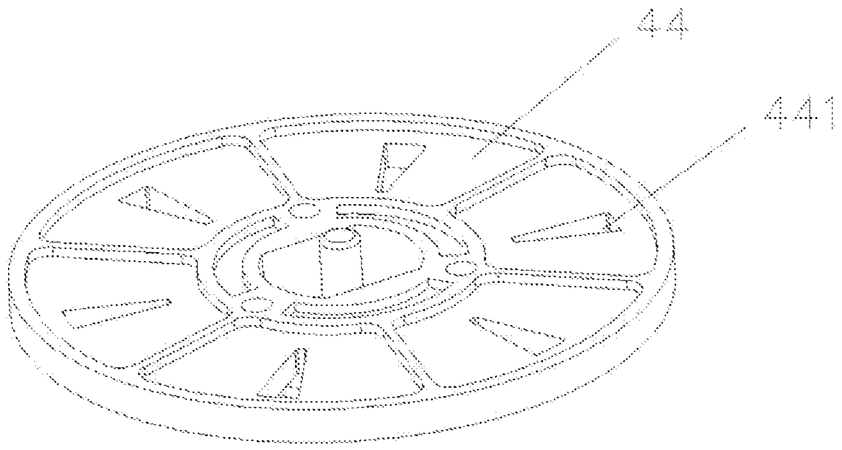
FIG. 11 is a structural schematic diagram of a slave wheel of the waterway switching structure for the multifunctional shower head according to an embodiment of the present disclosure.

Referring to FIG. 1-FIG. 11, according to one embodiment of the present disclosure, a waterway switching structure for a multifunctional shower head is provided, which includes a water diversion seat 1 with a water inlet channel 101, a water outlet body 2 with a plurality of waterways, a switching assembly 3, and a driving assembly 4. The water diversion seat 1 is connected to the water outlet body 2 and a water diversion chamber 201 is formed between the water diversion seat 1 and the water outlet body 2. The water diversion chamber 201 communicates with the water inlet channel 101, and an inner bottom wall of the water diversion chamber 201 is provided with a plurality of water diversion holes 202. The water diversion holes 202 correspondingly communicate with the plurality of waterways. The driving assembly 4 includes a rotating shaft 41, a driving wheel 42, a master wheel 43, and a slave wheel 44. The driving wheel 42 is rotatably connected to the rotating shaft 41 and is located on a top surface of the water diversion seat 1. The master wheel 43 is linked to the rotating shaft 41 in a transmission manner, namely, a rotation of the master wheel 43 will correspondingly cause the rotating shaft 41 to rotate and vice versa. The master wheel 43 is located between the driving wheel 42 and the water diversion seat 1. The slave wheel 44 is linked to the rotating shaft 41 in a transmission manner, namely, a rotation of the rotating shaft 41 will correspondingly cause the slave wheel 44 to rotate. The slave wheel 44 is located in the water diversion chamber 201. A first end of the driving wheel 42 is provided with a fixing groove 421, and the fixing groove 421 is movably provided with a driving detent 45. An end of the driving detent 45 fits with the gear teeth of the master wheel 43 to move the master wheel 43 forward and prevents it from moving backward. The slave wheel 44 is provided with a plurality of water inlet holes 441. The switching assembly 3 is rotatably connected to the first end of the driving wheel 42 configured with the driving detent 45 to drive the driving wheel 42 to rotate around the rotating shaft 41. A second end of the driving wheel 42 opposite to the driving detent 45 is connected to a resetting member 46, and the resetting member 46 drives the driving wheel 42 to move backward to an original position when a force applied on the driving wheel 42 through the switching assembly 3 is retracted. The slave wheel 44 is driven by the driving assembly 4 to enable the water inlet holes 441 selectively switch on the water diversion holes 202 communicating with the respective waterway. Specifically, the master wheel 43 and salve wheel 44 are linked to the rotating shaft 41 by configuring flat portions on corresponding positions of the rotating shaft 41 and openings matched with the flat portions on the axis positions of the master wheel 43 and slave wheel 44. By doing so, the rotation of the master wheel 43 can cause the rotating shaft 41 to rotate simultaneously, and the rotation of the rotating shaft 41 can further cause the salve wheel 44 to rotate simultaneously.

According to an embodiment of the present disclosure, the switching assembly 3 includes a button 31, a sliding rod 32, and a pull rod 33. The sliding rod 32 is linked to the button 31 and is located on the top surface of the water diversion seat 1. A first end of the pull rod 33 is hinged with the sliding rod 32, and a second end of the pull rod 33 is rotatably connected with the first end of the driving wheel 42. The sliding rod 32 linearly moves in a direction opposite to a direction of pressing the button 31, and the pull rod 33 converts a linear motion of the sliding rod 32 into a rotational motion of the driving wheel 42, so that the center of the driving wheel 42 may rotate in a counter-clockwise direction about the rotating shaft 41. Specifically, the pull rod 33 may include a first connecting portion 331 and a second connection portion 332 that are fixedly connected to each other with an included angle. The first connection portion 331 is connected to the sliding rod 32 and extending in the same direction as the sliding rod 32. The second connection portion 332 is connected to the driving wheel 42. The included angle between the first connecting portion 331 and the second connecting portion 332 may be 100-160°. Preferably, the included angle may be around 140°.

According to an embodiment of the present disclosure, the water diversion seat 1 includes a water inlet portion 11 and a fixing portion 12. A middle part of the water inlet portion 11 is configured with a through hole 102, the water inlet channel 101 surrounds the through hole 102. A connection joint between the water inlet portion 11 and the fixing portion 12 is provided with a water inlet port 103. The water inlet port 103 communicates with the water diversion chamber 201. A water inlet cover 13 is configured above the water inlet portion 11, and the water inlet cover 13 is provided with a through hole 104 corresponding to the through hole 102 of the water inlet portion 11. Two opposite side walls of the through hole 104 of the water inlet cover 13 are respectively provided with a sliding rail 105, the two side walls of the sliding rod 32 are respectively provided with a sliding groove 321, and the sliding rail 105 is matched with the sliding groove 321.

According to an embodiment of the present disclosure, the button 31 includes a key 311, an engaging element 312, and a swing lever 313. The engaging element 312 is clamped with the water inlet portion 11 of the water division seat 1, a middle part of the swing lever 313 is hinged with the water inlet portion 11 by a pin. The swing lever 313 includes two segments inclined leftwards about the hinged center. An included angle of the two segments is 100-150°. Preferably, the included angle is around 120°. A lower end of the swing lever 313 abuts against an inner bottom wall of the key 311, and an upper end of the swing lever 313 extends obliquely through the through holes 102 and 104 of the water inlet portion 11 and the water inlet cover 13 and props between two side walls of an opening 321 in the middle of the sliding rod 32. A rear side surface of the opening 321 is provided with a supporting rod 322 to abut against a rear side of swing lever 313. According to an implementation of the present disclosure, the resetting member 46 is a second spring, and the second spring is connected between the second end of the driving wheel 42 and the water inlet cover 13.

According to an embodiment of the present disclosure, the slave wheel 44 cooperates with a sealing assembly 5 to make a resistance of a relative movement between the slave wheel 44 and the sealing assembly 5 slightly larger than a resetting force of the resetting member 46, so as to ensure that the master wheel 43 will not rotate backward while the resetting process of the driving wheel 42. Specifically, the sealing assembly 5 may include an irregular sealing member 51, a first O-ring 52, a second O-ring 53, and a third O-ring 54. The irregular sealing member 51 is arranged between the inner bottom wall of the water diversion chamber 201 and the lower surface of the slave wheel 44. The irregular sealing member 51 includes a plurality of special-shaped sealing rings connected to one another to form an annular structure. The special-shaped sealing rings are in an one-to-one correspondence with the water diversion holes 202 in the aspects of shape and position. The first O-ring 52 is arranged between the bottom surface of the water diversion seat 1 and the slave wheel 44 and mounted on the rotating shaft 41. The second O-ring 53 is arranged on the inner side wall of the water diversion seat 1 and surrounds the slave wheel 44. The third O-ring 54 is arranged in the through hole in the center of the fixing portion 12 of the water diversion seat 1 for the insertion of the rotating shaft 41.

According to an embodiment of the present disclosure, the master wheel 43 is a ratchet wheel, and the driving detent 45 includes a main body 451, a wedge block 452, and a fixing rod 453. The fixing rod 453 is fixedly connected to a rear end surface of the main body 451, a rear end surface of the wedge block 452 is fixedly connected to a front end surface of the main body 451, and a front end surface of the wedge block 452 is an inclined surface that fits with an arc surface of the gear teeth of the master wheel 43. A right end surface of the wedge block 452 is a stopping surface, and the stopping surface fits into a notch of the master wheel 43. The configuration of the wedge block 452 may enable the master wheel 43 to move forward and prevents it from moving backward, so that the structure may prevent the skipping over phenomenon. The left end surface of the wedge block 452 may further be configured with a reinforcing rib for enhancing the structural strength of the driving detent 45. The first end of the driving wheel 42 is provided with a fixing groove 421, a rear end surface of the fixing groove 421 is provided with a forwardly extending hollow positioning column 422, a first spring 423 is provided around the hollow positioning column 422 and the fixing rod 453, and two ends of the first spring 423 respectively abut the rear end surface of the fixing groove 421 and the rear end surface of the main body 451. The main body 451 is slidably configured in the fixing groove 421.

According to an embodiment of the present disclosure, the main body 451 includes an upper positioning plate 4511, a lower positioning plate 4512, and a positioning column 4513. The positioning column 4513 is connected between the upper positioning plate 4511 and the lower positioning plate 4512 in a middle position and forms sliding grooves on both sides. Two side walls of the fixing groove 421 are respectively provided with a wedge-shaped sliding rail 4211 at a position near a front end surface of the fixing groove 421. Two opposite side surfaces of the wedge-shaped sliding rails 4211 each have a concave arc shape, which jointly form a space for holding the first spring 423, and the wedge-shaped sliding rails 4211 are slidably connected with the sliding grooves.

According to an embodiment of the present disclosure, the water outlet body 2 includes the water diversion plate 21, a water separation plate 22, a first outlet panel 23, and a second outlet panel 24 that are sequentially connected from an inside to an outside. An inwardly concave recess 211 is provided in a middle position of the water diversion plate 21, the fixing portion 12 is engaged with the recess 211, a bottom wall of the recess 211 is provided with the plurality of water division holes 202. The water separation plate 22 is sequentially provided with three identical water outlet groups, and each water outlet group is sequentially provided with three different water outlet holes, and three different water outlet holes are respectively connected to the three waterways defined by the first outlet panel 23 and the second outlet panel 24. The slave wheel 44 is provided with six water inlet holes with uniform intervals, and the six water inlet holes selectively switch on one of the three waterways.

According to an embodiment of the present disclosure, the water diversion plate 21, the second outlet panel 24, and the water separation plate 22 are made of polyformaldehyde (POM) material. An outer edge of a bottom surface of the water diversion plate 21 and an outer edge of an upper surface of the second outlet panel 24 are connected by hot plate welding, and an bottom outer edge of the recess 211 is also connected to an outer edge of an upper surface of the water separation plate 22 by hot plate welding. Optionally, one or more components selected from the group consisting of the water division seat 1, sliding rod 32, water inlet cover 13, slave wheel 44, driving wheel 42, master wheel 43, rotating shaft 41, engaging element 312, and swing lever 313 may be made of polyformaldehyde (POM) material.

The working principle of the present disclosure is described below.

As shown in FIGS. 1-8, when the key 311 is pressed, the swing lever 313 pulls the sliding rod 32 to linearly move backward along the sliding rails 105, and the driving wheel 42 rotates in counter-clockwise direction under the pull of the pull rod 33. The upper surface of the fixing portion 12 of the water division seat 1 is correspondingly provided with limiting structures so that the movement of the first and second ends of the driving wheel 42 are limited within the range defined by the limiting structures. The rotation of the driving wheel 42 will drive the driving detent 45, the first spring 423, and the master wheel 43 to rotate counterclockwise simultaneously. When the key 311 is released, the master wheel 43 does not move due to the resistance created by the sealing assembly, and the driving wheel 42 rotates backward to its original position under the action of the resetting spring 46. At the same time, the driving detent 45 is driven by the driving wheel 42 to sweep over the tooth surface of the master wheel 43, and then fits into the notch of the master wheel 43 again under the action of the spring 423. This process is repeated each time when the key 311 is pressed, and for each press the slave wheel 44 rotates at a certain angle, which may be 20° in one specific implementation, so as to achieve the switching of the water outlet functions. The structure of the present disclosure may prevent the phenomenon of skipping over, and has a suitable operating pressure of the button and better sealing performance.

According to another aspect of the present disclosure, a multifunctional shower head is provided, which includes a housing and the aforementioned waterway switching structure. The housing includes an upper cover 61 and a decorative cover 62, and the upper cover 61 includes a head portion 611 and a handle portion 612 connected to the head portion 611. The decorative cover 62 is snap-fitted with the head portion 611 to form a chamber. A main shaft 613 is installed in the handle portion 612 for communicating with a water inlet pipe, and the waterway switching structure is installed in the chamber. The water inlet channel 101 communicates with the main shaft 613.

The implementations in the above-mentioned embodiments may be further combined or made minor substitutions, and the embodiments merely describe preferred implementations of the present disclosure, and do not limit the concept and scope of the present disclosure. Without departing from the design concept of the present disclosure, the various changes and improvements made to the technical solution of the present disclosure by those of ordinary skill in the art should be considered as falling within the scope of the present disclosure.

What is claimed is:

1. A waterway switching structure for a multifunctional shower head comprising a water diversion seat with a water inlet channel, a water outlet body with a plurality of waterways, a switching assembly, and a driving assembly; wherein the water diversion seat is connected to the water outlet body and a water diversion chamber is formed between the water diversion seat and the water outlet body, the water diversion chamber communicates with the water inlet channel, and an inner bottom wall of the water diversion chamber is provided with a plurality of water diversion holes, the water diversion holes correspondingly communicate with the plurality of waterways;

the driving assembly comprises a rotating shaft, a driving wheel, a master wheel, and a slave wheel, the driving wheel is rotatably connected to the rotating shaft and is located on a top surface of the water diversion seat, the master wheel is linked to the rotating shaft and is located between the driving wheel and the water diversion seat, the slave wheel is linked to the rotating shaft and is located in the water diversion chamber, a first end of the driving wheel is movably provided with a driving detent, and an end of the driving detent fits with gear teeth of the master wheel to move the master wheel forward and prevents it from moving backward, the slave wheel is provided with a plurality of water inlet holes;

the switching assembly is rotatably connected to a first end of the driving wheel to drive the driving wheel to rotate around the rotating shaft, a second end of the driving wheel is connected to a resetting spring, and the resetting spring is tensioned when the driving wheel is driven by the switching assembly, and the resetting spring drives the driving wheel to move backward to an original position when a force applied on the driving wheel through the switching assembly is retracted; and the slave wheel is driven to enable the water inlet holes selectively switch on the water diversion holes communicating with a desired waterway of the plurality of waterways.

2. The waterway switching structure for the multifunctional shower head according to claim 1, wherein the switching assembly comprises a button, a sliding rod, and a pull rod;

the sliding rod is linked to the button and is located on the top surface of the water diversion seat, a first end of the pull rod is hinged with the sliding rod, and a second end of the pull rod is rotatably connected with the first end of the driving wheel, the sliding rod linearly moves in a direction opposite to a direction of pressing the button, and the pull rod is configured to convert a linear motion of the sliding rod into a rotational motion of the driving wheel.

3. The waterway switching structure for the multifunctional shower head according to claim 2, wherein the slave wheel cooperates with a sealing assembly to make a resistance of a relative movement between the slave wheel and the sealing assembly slightly larger than a resetting force of the resetting spring.

4. The waterway switching structure for the multifunctional shower head according to claim 1, wherein the master wheel is a ratchet wheel, the driving detent comprises a main body, a wedge block, and a fixing rod;

the fixing rod is fixedly connected to a rear end surface of the main body, a rear end surface of the wedge block is fixedly connected to a front end surface of the main body, and a front end surface of the wedge block is an inclined surface that fits with an arc surface of the gear teeth of the master wheel, a right end surface of the wedge block is a stopping surface, and the stopping surface fits into a notch of the master wheel;

the first end of the driving wheel is provided with a fixing groove, a rear end surface of the fixing groove is provided with a forwardly extending hollow positioning column, a first spring is provided around the hollow positioning column and the fixing rod, and two ends of the first spring respectively abut the rear end surface of the fixing groove and the rear end surface of the main body; and the main body is slidably configured in the fixing groove.

5. The waterway switching structure for the multifunctional shower head according to claim 4, wherein the main body comprises an upper positioning plate, a lower positioning plate, and a positioning column;

the positioning column is connected between the upper positioning plate and the lower positioning plate in a middle position and forms sliding grooves on both sides, two side walls of the fixing groove are respectively provided with a wedge-shaped sliding rail at a position near a front end surface of the fixing groove, two opposite side surfaces of the wedge-shaped sliding rails each have a concave arc shape to form a space for holding the first spring, and the wedge-shaped sliding rails are slidably connected with the sliding grooves.

6. The waterway switching structure for the multifunctional shower head according to claim 1, wherein the water diversion seat comprises a water inlet portion and a fixing portion;

a middle part of the water inlet portion is configured with a through hole, the water inlet channel surrounds the through hole, a connection joint between the water inlet portion and the fixing portion is provided with a water inlet port, the water inlet port communicates with the water diversion chamber, a water inlet cover is configured above the water inlet portion, and the water inlet cover is provided with a through hole corresponding to the through hole of the water inlet portion; and two opposite side walls of the through hole of the water inlet cover are respectively provided with a sliding rail, the two side walls of the sliding rod are respectively provided with a sliding groove, and the sliding rail is matched with the sliding groove.

7. The waterway switching structure for the multifunctional shower head according to claim 6, wherein the button comprises a key, an engaging element, and a swing lever;

the engaging element is clamped with the water inlet portion, a middle part of the swing lever is hinged with the water inlet portion by a pin, a first end of the swing lever abuts against an inner bottom wall of the key, and a second end of the swing lever extends obliquely through the through holes of the water inlet portion and the water inlet cover and props between two side walls of an opening in the middle of the sliding rod, a rear side surface of the opening is provided with a supporting rod to abut against a rear side of the swing lever; and the resetting spring, and the resetting spring is connected between the second end of the driving wheel and the water inlet cover.

8. The waterway switching structure for the multifunctional shower head according to claim 6, wherein the water outlet body comprises the water diversion plate, a water separation plate, a first outlet panel, and a second outlet panel that are sequentially connected from an inside to an outside;

an inwardly concave recess is provided in a middle position of the water diversion plate, the fixing portion is engaged with the recess, a bottom wall of the recess is provided with the plurality of water division holes, the water separation plate is sequentially provided with three identical water outlet groups, and each water outlet group is sequentially provided with three different water outlet holes, and the three different water outlet holes are respectively connected to three waterways defined by the first outlet panel and the second outlet panel, the slave wheel is provided with six water inlet holes with uniform intervals, and the six water inlet holes selectively switch on one of the three waterways.

9. The waterway switching structure for the multifunctional shower head according to claim 8, wherein the water diversion plate, the second outlet panel, and the water separation plate are made of polyformaldehyde (POM) material, an outer edge of a bottom surface of the water diversion plate and an outer edge of an upper surface of the second outlet panel are connected by hot plate welding, and an bottom outer edge of the recess is also connected to an outer edge of an upper surface of the water separation plate by hot plate welding.

10. A multifunctional shower head comprising a housing and the waterway switching structure according to claim 1, wherein the housing comprises an upper cover and a decorative cover, the upper cover comprises a head portion and a handle portion connected to the head portion, the decorative cover is snap-fitted with the head portion to form a chamber, a main shaft is installed in the handle portion for communicating with a water inlet pipe, the waterway switching structure is installed in the chamber, and the water inlet channel communicates with the main shaft.

* * * * *